Jan. 16, 1934.　　　　F. H. OWENS　　　　1,943,925

MEANS AND METHOD FOR RECORDING SOUND PHOTOGRAPHICALLY

Original Filed Sept. 16, 1929

INVENTOR.
FREEMAN H. OWENS.

BY
Philip S. Hopkins
ATTORNEY.

Patented Jan. 16, 1934

1,943,925

UNITED STATES PATENT OFFICE 1,943,925

MEANS AND METHOD FOR RECORDING SOUND PHOTOGRAPHICALLY

Freeman H. Owens, New York, N. Y.

Application September 16, 1929, Serial No. 393,029. Renewed June 8, 1933

4 Claims. (Cl. 179—100.3)

My invention relates to a means and method for recording sound photographically and has for its primary object the provision of a gas filled tube adapted to fluctuate in actinic light passing value in accordance with sound modulations and through which is adapted to pass a beam of actinic light for exposure upon a sensitized traveling film, said actinic light being modulated in accordance with the fluctuations of said gas filled lamp.

More specifically, my invention contemplates the use of a glow lamp the illumination of which is non-actinic in character or partially non-actinic in character but which is responsive to sound modulations to such an extent as to vary the non-actinic character thereof whereby to permit actinic light to pass therethrough corresponding to modulation to the variations thereof.

It has been found that certain air evacuated gas filled tubes have the characteristic when the current of electricity is passed therethrough, of glowing and that the glow in such tubes varies or fluctuates in intensity in accordance with the modulations of the electric current passing therethrough. In my invention, I utilize such characteristics of gas filled tubes as a shutter for passing actinic light to a traveling sensitized film for recording the sound records thereon modulating the passage of such actinic light by varying the intensity of the glow lamp by the sound to be recorded.

The character of the glow in the glow lamp may be completely non-actinic or only partially so but should be such as to respond readily any fluctuations to sound modulated electric impulses passing therethrough.

Other objects and advantages in details of construction and arrangement of parts as well as the method will be apparent as the description now proceeds reference being had to the figures of the accompanying drawing forming a part of this application and wherein like reference numerals indicate like parts.

In the drawing:—

Figures 1, 2:
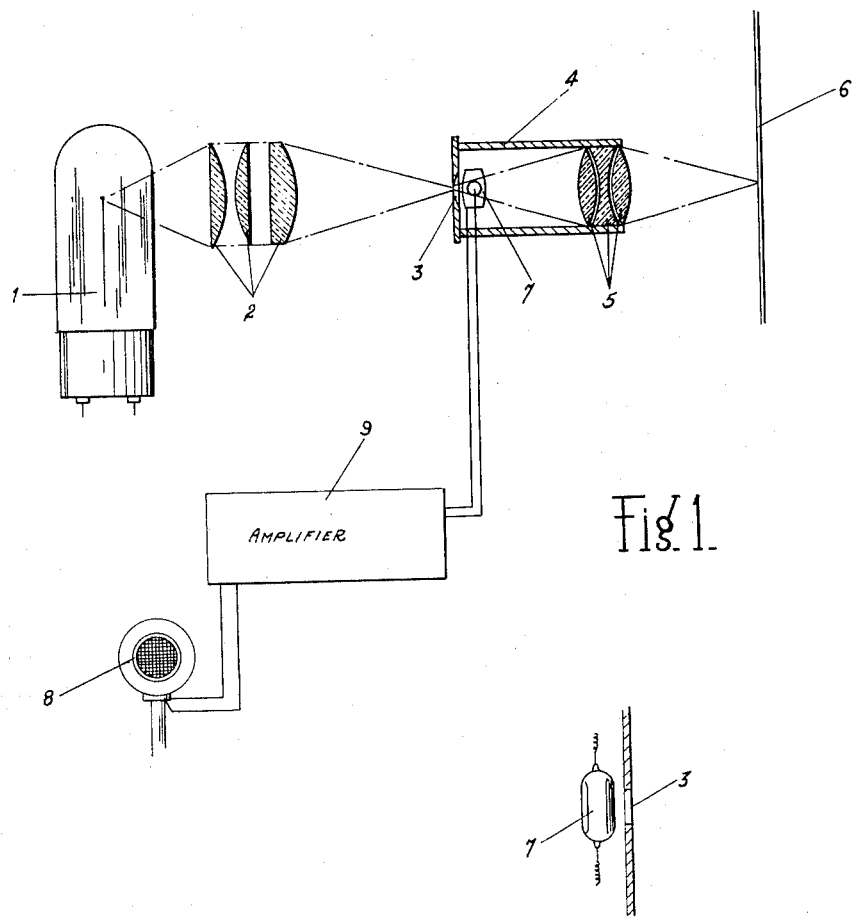
Figure 1 is a partially diagrammatic and partially sectional side view illustrating my invention.
Figure 2 is a detailed top plan view of the glow tube of my invention in a slightly modified manner of use.

Reference character 1 refers to a lamp the light from which is preferably of constant intensity and of high actinic value. The light from this lamp is caught by condenser lenses 2 and focused upon a slit 3 in one wall of a suitable housing 4, the illuminated aerial image of which slit is adapted to be focused by the lens 5 at a point upon a traveling film 6 which may be suitably moved at a uniform speed in alignment with said slit.

Obviously with the construction described so far, the lighting of the lamp 1 and the movement of the film 6 will produce on the film a uniformly exposed strip representing the aerial image of the slit 3. In order to modulate the actinic light from the lamp 1 in accordance with sound to be recorded upon the film 6, I have interposed in the path of the light a glow tube 7 preferably air evacuated and filled with a gas of such character that when a current of electricity is passed therethrough from any suitable source (not shown), the tube 7 will glow. If now, the current supply to the glow tube 7 is sound modulated as by means of the sound translating microphone 8 and amplifier 9, the glow of the tube 7 will fluctuate accordingly.

Assume now that the glow tube 7 is filled with a gas of such character that when a current of electricity of a predetermined amount is passed therethrough the tube will glow with a non-actinic light which serves to intercept the actinic rays of light from the lamp 1. Obviously, sound modulation of the glow in the tube 7 serves to fluctuate the glow in accordance with the sound waves thereby rendering the tube more or less actinic in character proportionate with the sound modulations. As the glow tube 7 varies, it will offer more or less resistance to the passage of the actinic rays from the lamp 1 in proportion to the sound waves and thus permit the passage of actinic light so modulated to the film 6 where it is recorded.

Assume, secondly for instance, that the glow tube 7 is filled with a gas, the characteristic of which is that the passage of electricity therethrough causes the tube to glow with an only partially non-actinic light. Obviously, therefore, a certain amount of actinic light from the lamp 1 will pass at all times through the tube to the film 6. The amount of such actinic light which passes however, may be varied in the same manner as above described, namely, by modulating the intensity of the glow tube by sound translated into electrical impulses and passed through the glow tube 7.

A third manner in which the glow tube may be used as a modulator for the actinic light of lamp 1, is to provide the glow tube 7 with a gas which does not glow with a certain fixed amount of electric current passing therethrough, but which will glow with the least additional current passing therethrough. In such form the sound waves may be translated to electric impulses and imposed as before, on the current passing through the glow tube, such impulses providing the additional current necessary to cause the tube 7 to glow and of course the glow thereof will be directly representative or characteristic of the sound waves. The glow in the tube 7 thus produced, being of non-actinic character, serves to modulate the actinic light from the lamp 1 to the film 6.

Although there may be may gases which may be used in a glow tube of this character and for this purpose, that is, as a shutter or variable interceptor or modulator of actinic light, I do not limit myself of course, to any particular gas.

Also, I do not wish to be limited to the particular position of the glow tube with respect to the beam of actinic light for it may be positioned at the rear of the slit 3 as shown in Figure 1 or in front of the slit 3 as shown in Figure 2.

Of course, many changes may be made in details of construction and operation without departing from the spirit and scope of my invention. I do not limit myself therefore, to the form herein shown and described other than by the appended claims.

I claim:

1. Photographic sound recording means comprising a source of actinic light of constant intensity, a traveling film adapted to receive rays of light from said source, a glow lamp of non-actinic light disposed in the path of said rays, and sound controlled means for rendering said glow lamp a modulator for said rays in accordance with the sound to be recorded.

2. Photographic sound recording means comprising a source of actinic light of constant intensity, a traveling film adapted to receive rays of light from said source, a glow lamp of non-actinic light disposed in the path of said rays, a sound controlled means for rendering said glow lamp a modulator for said rays in accordance with the sound to be recorded, said glow lamp being rendered varyingly non-actinic in accordance with the sound to be recorded, thereby to varyingly intercept and pass said rays in accordance with said sound.

3. Photographic sound recording means comprising a source of actinic light of constant intensity, a traveling film adapted to receive rays of light from said source, a glow lamp of substantially non-actinic light of variable actinic light passing value disposed in the path of said rays, and sound controlled means for varying said value whereby to modulate said rays in accordance with the sound to be recorded.

4. The method of photographically recording sound comprising the steps of passing actinic light rays to a traveling film, variably intercepting said rays by substantially non-actinic light of variable actinic light passing value, and modulating said intercepting light by sound to be recorded.

FREEMAN H. OWENS.